(12) United States Patent  
Thomsen

(10) Patent No.: US 9,208,180 B2  
(45) Date of Patent: *Dec. 8, 2015

(54) DETERMINATION OF DATABASE STATISTICS USING APPLICATION LOGIC

(71) Applicant: Dirk Thomsen, Berlin (DE)

(72) Inventor: Dirk Thomsen, Berlin (DE)

(73) Assignee: SAP SE, Walldorf (DE)

( * ) Notice: Subject to any disclaimer, the term of this patent is extended or adjusted under 35 U.S.C. 154(b) by 0 days.

This patent is subject to a terminal disclaimer.

(21) Appl. No.: 14/282,180

(22) Filed: May 20, 2014

(65) Prior Publication Data

US 2014/0258337 A1 Sep. 11, 2014

Related U.S. Application Data

(63) Continuation of application No. 11/314,709, filed on Dec. 21, 2005, now Pat. No. 8,732,138.

(51) Int. Cl.
*G06F 17/30* (2006.01)

(52) U.S. Cl.
CPC .............. *G06F 17/30289* (2013.01)

(58) Field of Classification Search
CPC ................................. G06F 17/30289
See application file for complete search history.

(56) References Cited

U.S. PATENT DOCUMENTS

| | | | |
|---|---|---|---|
| 5,899,986 A * | 5/1999 | Ziauddin | 707/2 |
| 6,865,567 B1 * | 3/2005 | Oommen et al. | 707/2 |
| 7,124,146 B2 * | 10/2006 | Rjaibi et al. | 707/102 |
| 7,171,408 B2 * | 1/2007 | Zuzarte | 707/5 |
| 2003/0084025 A1 * | 5/2003 | Zuzarte | 707/2 |
| 2003/0229617 A1 * | 12/2003 | Rjaibi et al. | 707/1 |
| 2004/0181521 A1 * | 9/2004 | Simmen | 707/3 |
| 2005/0278357 A1 * | 12/2005 | Brown et al. | 707/100 |
| 2006/0288022 A1 * | 12/2006 | Rjaibi et al. | 707/100 |
| 2007/0130180 A1 * | 6/2007 | Rasmussen | 707/100 |

* cited by examiner

*Primary Examiner* — Syed Hasan

(74) *Attorney, Agent, or Firm* — Buckley, Maschoff & Talwalkar LLC

(57) ABSTRACT

A database system may provide determination of statistics for a field of a database table. The determination may include determination of whether the field of the table is associated with a check table, and, if the field of the table is associated with a check table, determination of a number of distinct values of the field in the table based on a number of distinct values of the field in the check table.

10 Claims, 9 Drawing Sheets

240 — Sales Document Header Status (SDHS)

| Field | Key | CheckTable | Cardinality | IntegrityChk |
|---|---|---|---|---|
| Client | Yes | T000 | 1:0..n | No |
| DocNumber | Yes | N/A | N/A | N/A |
| ConfirmationStatus | No | N/A | N/A | N/A |
| DeliveryStatus | No | N/A | N/A | N/A |
| BillingStatus | No | N/A | N/A | N/A |
| +additional non-key fields | | | | |

241 — Sales Document Header Data (SDHD)

| Field | Key | CheckTable | Cardinality | IntegrityChk |
|---|---|---|---|---|
| Client | Yes | T000 | 1:0..n | No |
| DocNumber | Yes | SDHS | 1:1 | No |
| DocCurrency | No | TCURC | 1:0..n | No |
| SalesOrganization | No | TVKO | 1:0..n | No |
| DistributionChannel | No | TVKOV | 1:0..n | No |
| Division | No | TVTA | 1:0..n | No |
| +additional non-key fields | | | | |

242 — Sales Document Item Status (SDIS)

| Field | Key | CheckTable | Cardinality | IntegrityChk |
|---|---|---|---|---|
| Client | Yes | T000 | 1:0..n | No |
| DocNumber | Yes | SDHS | 1:0..n | No |
| ItemNumber | Yes | N/A | N/A | N/A |
| PackingStatus | No | N/A | N/A | N/A |
| DeliveryStatus | No | N/A | N/A | N/A |
| +additional non-key fields | | | | |

243 — Sales Document Item Data (SDID)

| Field | Key | CheckTable | Cardinality | IntegrityChk |
|---|---|---|---|---|
| Client | Yes | T000 | 1:0..n | No |
| DocNumber | Yes | SDHS | 1:0..n | No |
| ItemNumber | Yes | SDIS | 1:1 | No |
| MaterialNumber | No | MARA | 1:0..n | No |
| Quantity | No | N/A | N/A | N/A |
| +additional non-key fields | | | | |

124

140 — Sales Document Header Status (SDHS)     114

| Field | Key | CheckTable | Cardinality |
|---|---|---|---|
| Client | Yes | T000 | 1:0..n |
| DocNumber | Yes | N/A | N/A |
| ConfirmationStatus | No | N/A | N/A |
| DeliveryStatus | No | N/A | N/A |
| BillingStatus | No | N/A | N/A |

+additional non-key fields

141 — Sales Document Header Data (SDHD)

| Field | Key | CheckTable | Cardinality |
|---|---|---|---|
| Client | Yes | T000 | 1:0..n |
| DocNumber | Yes | SDHS | 1:1 |
| DocCurrency | No | TCURC | 1:0..n |
| SalesOrganization | No | TVKO | 1:0..n |
| DistributionChannel | No | TVKOV | 1:0..n |
| Division | No | TVTA | 1:0..n |

+additional non-key fields

142 — Sales Document Item Status (SDIS)

| Field | Key | CheckTable | Cardinality |
|---|---|---|---|
| Client | Yes | T000 | 1:0..n |
| DocNumber | Yes | SDHS | 1:0..n |
| ItemNumber | Yes | N/A | N/A |
| PackingStatus | No | N/A | N/A |
| DeliveryStatus | No | N/A | N/A |

+additional non-key fields

143 — Sales Document Item Data (SDID)

| Field | Key | CheckTable | Cardinality |
|---|---|---|---|
| Client | Yes | T000 | 1:0..n |
| DocNumber | Yes | SDHS | 1:0..n |
| ItemNumber | Yes | SDIS | 1:1 |
| MaterialNumber | No | MARA | 1:0..n |
| Quantity | No | N/A | N/A |

+additional non-key fields

FIG. 3

240 → Sales Document Header Status (SDHS)

| Field | Key | CheckTable | Cardinality | IntegrityChk |
|---|---|---|---|---|
| Client | Yes | T000 | 1:0..n | No |
| DocNumber | Yes | N/A | N/A | N/A |
| ConfirmationStatus | No | N/A | N/A | N/A |
| DeliveryStatus | No | N/A | N/A | N/A |
| BillingStatus | No | N/A | N/A | N/A |

+additional non-key fields

241 → Sales Document Header Data (SDHD)

| Field | Key | CheckTable | Cardinality | IntegrityChk |
|---|---|---|---|---|
| Client | Yes | T000 | 1:0..n | No |
| DocNumber | Yes | SDHS | 1:1 | No |
| DocCurrency | No | TCURC | 1:0..n | No |
| SalesOrganization | No | TVKO | 1:0..n | No |
| DistributionChannel | No | TVKOV | 1:0..n | No |
| Division | No | TVTA | 1:0..n | No |

+additional non-key fields

242 → Sales Document Item Status (SDIS)

| Field | Key | CheckTable | Cardinality | IntegrityChk |
|---|---|---|---|---|
| Client | Yes | T000 | 1:0..n | No |
| DocNumber | Yes | SDHS | 1:0..n | No |
| ItemNumber | Yes | N/A | N/A | N/A |
| PackingStatus | No | N/A | N/A | N/A |
| DeliveryStatus | No | N/A | N/A | N/A |

+additional non-key fields

243 → Sales Document Item Data (SDID)

| Field | Key | CheckTable | Cardinality | IntegrityChk |
|---|---|---|---|---|
| Client | Yes | T000 | 1:0..n | No |
| DocNumber | Yes | SDHS | 1:0..n | No |
| ItemNumber | Yes | SDIS | 1:1 | No |
| MaterialNumber | No | MARA | 1:0..n | No |
| Quantity | No | N/A | N/A | N/A |

+additional non-key fields

↖ 124    FIG. 4

SALES DOCUMENT HEADER STATUS (SDHS) — 600

| Client | DocNumber | ConfirmationStatus | DeliveryStatus | BillingStatus |
|---|---|---|---|---|
| 000 | D345 | Confirmed | Delivered | Billed |
| 000 | D456 | Not Confirmed | Not Shipped | Not Billed |
| 100 | D555 | Confirmed | Delivered | Not Billed |
| 200 | D678 | Confirmed | In Transit | Billed |

FIG. 6

| CLIENT TABLE (T000) | | | | | |
|---|---|---|---|---|---|
| Type | SAP Delivery | Development | Testing | Productive |
| Client | 000 | 100 | 200 | 800 |

| SALES DOCUMENT HEADER DATA (SDHD) | | | | | |
|---|---|---|---|---|---|
| Client | DocNumber | DocCurrency | SalesOrg | DistribChannel | Division |
| 000 | D345 | Dollars | SO32 | AgendSales | USA |
| 000 | D456 | Yen | SO32 | WebShop | Japan |
| 100 | D555 | Euros | SO4 | RetailShop | UK |
| 200 | D678 | Yen | SO4 | WebShop | Japan |

FIG. 9

DETERMINATION OF DATABASE STATISTICS USING APPLICATION LOGIC

CLAIM OF PRIORITY

This patent application claims the benefit of priority, under 35 U.S.C. §120, of U.S. Non-Provisional Patent Application Ser. No. 11/314,709, filed Dec. 21, 2005 entitled "DETERMINATION OF DATABASE STATISTICS USING APPLICATIONLOGIC" the entire disclosure of which is incorporated herein by reference.

FIELD

Some embodiments relate to systems for optimizing database search strategies. In particular, some embodiments are associated with systems to determine optimizer statistics for a database based on table relationships that are typically unknown to the database.

BACKGROUND

A database management system may receive a query, search a database based on the query, and provide data resulting from the search. A query, however, specifies only desired data and not a manner in which a database management system should search the database for the desired data. A database management system may therefore be required to select from multiple strategies for searching a database in response to a received query. For example, in response to a query specifying multiple joins, a database management system must determine an order in which to execute the multiple joins.

A database management system often includes an optimizer to select a most appropriate (e.g., fastest) search strategy for responding to a given query in a given situation. The optimizer selects the strategy based at least in part on optimizer statistics associated with the database. The optimizer statistics are determined based on data stored in the database.

Optimizer statistics may specify any characteristics of data stored in the database. For example, an optimizer statistic may specify a number of distinct values that are associated with a given field of a given table and/or a statistical distribution of such values. The foregoing optimizer statistics may be determined by reading each row of the given table, which can be unsuitably resource- and time-consuming if the given table is large. For large database tables, these statistics may be determined by reading only a sample of all rows in the table and extrapolating the statistics based on the sampling. However, if the extrapolated optimizer statistics are too inaccurate, the optimizer may select an inefficient search strategy based thereon.

The efficiency of a database system may therefore be improved by increasing the speed and/or accuracy with which optimization statistics are determined. Systems are therefore desired for efficient determination of optimizer statistics.

BRIEF DESCRIPTION OF THE DRAWINGS

FIG. 3 illustrates table definitions of an application data dictionary according to some embodiments.

FIG. 4 illustrates table definitions of a database data dictionary according to some embodiments.

FIG. 6 is a tabular representation of a portion of a data table stored in a database according to some embodiments.

FIG. 7 is a tabular representation of a portion of a data table stored in a database according to some embodiments.

FIG. 9 is a tabular representation of a portion of a data table stored in a database according to some embodiments.

DETAILED DESCRIPTION

Figure 1:
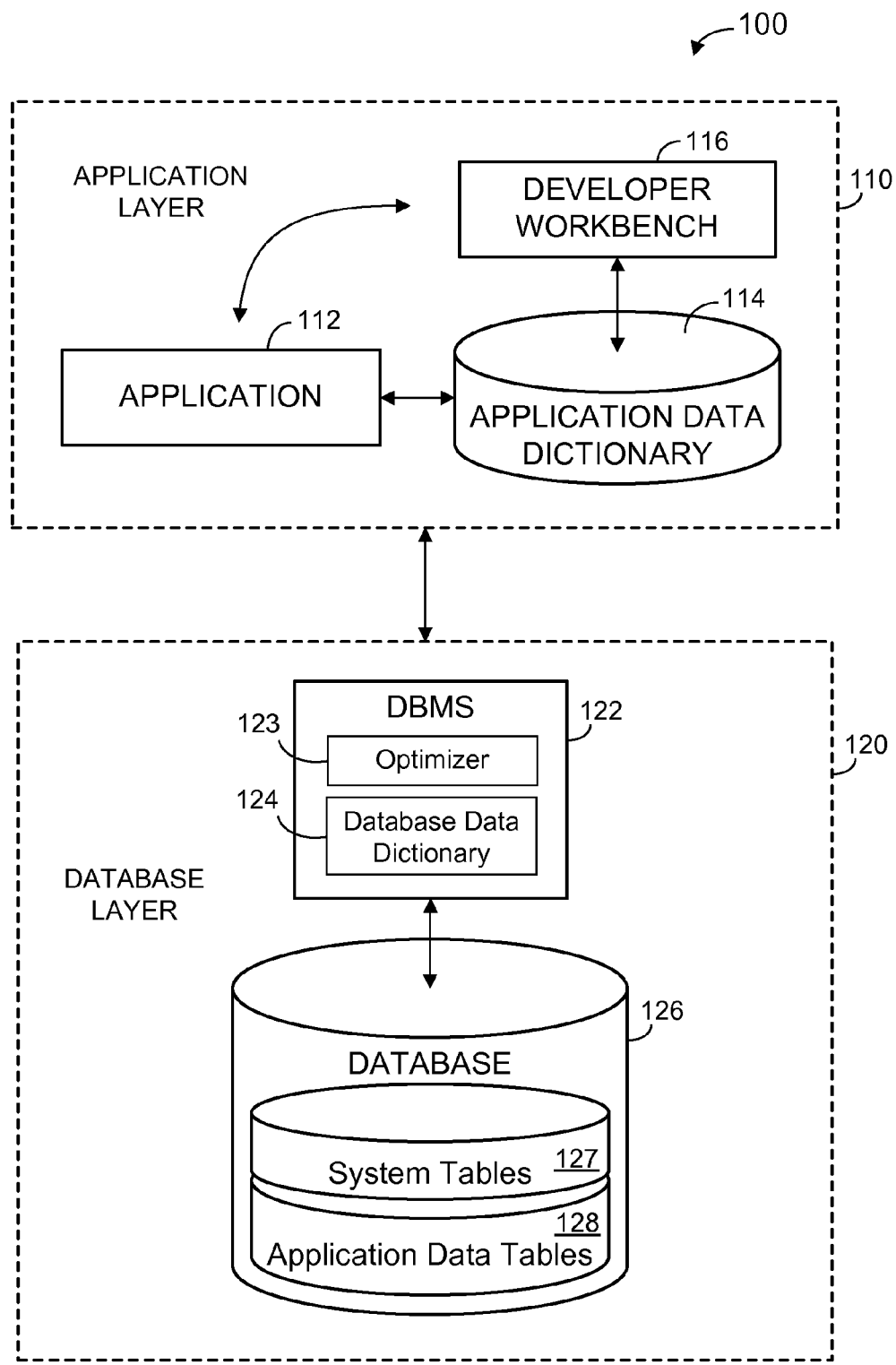
FIG. 1 is a block diagram of a system architecture according to some embodiments.

FIG. 1 is a block diagram of system 100 according to some embodiments. System 100 may provide efficient access to and/or modification of stored data. System 100 includes application layer 110 and database layer 120. Two or more of the elements of system 100 may be located remote from one another and may communicate with one another via a computer network and/or a dedicated connection. Moreover, each displayed element of system 100 may comprise any number of hardware and/or software elements, some of which are located remote from each other.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

Application layer 110 includes application 112, application data dictionary 114, and developer workbench 116. Application 112 may provide business monitoring, inventory control, online shopping, and/or any other suitable functions that are or become known. Application 112 may comprise executable program code written in any suitable language, including but not limited to Advanced Business Application Programming (ABAP) language. In this regard, application layer 110 may also comprise an interpreter corresponding to the language of application 112. Application layer 110 may comprise more than one application according to some embodiments.

Application 112 may conduct transactions with users in communication with application layer 110. Such transactions may include presenting user interfaces, receiving input from user interfaces, displaying list output, and modifying database tables. In some embodiments, application layer 110 and database layer 120 comprise two tiers of a three-tier client/server architecture such as the SAP R/3 architecture. A presentation layer (not shown) comprises the third tier and communicates with application layer 110 to provide graphical user interfaces through which users may request data from system 100.

Application data dictionary 114 stores definitions that define the logical structure of objects used by applications such as application 112 and how these objects are mapped to tables or views of an underlying database of database layer 120. According to some embodiments, the objects include tables, data elements (i.e., fields), structures, and domains. The definitions may be created and maintained by developer workbench 116. In doing so, workbench 116 may also be used to develop and modify applications such as application 112.

Application layer 110 is in bi-directional communication with database layer 120 as shown. Database layer 120 may operate to receive, store, manage and provide data, and includes Database Management System (DBMS) 122 and database 126. DBMS 122 may comprise any system for managing a database instance that is or becomes known. Generally, DBMS 122 may receive requests such as Structured Query Language (SQL) requests, may retrieve requested data from database 126, and may return the requested data to the requestor. DBMS 122 may also perform management, optimization, monitoring and other database-related tasks.

DBMS 122 includes optimizer 123 and database data dictionary 124. Optimizer 123 analyzes queries sent to database layer 120, determines search strategies for accessing data of database 126 specified in the queries, and selects one of the search strategies. Optimizer 123 may operate based on optimizer statistics that are determined by DBMS 122 and stored in database 126. Optimizer statistics may include any information related to individual data tables of database 126, including but not limited to number of rows, number of pages, index sizes, number of distinct values within a column or index, and distribution of values within a column or index.

Database data dictionary 124, sometimes referred to as a "database catalog", stores definitions of objects that are stored within database 126. These database objects may include tables, indexes, views, users and user groups. As will be described below, the definitions may be created or altered based on creation or alteration of a corresponding object in application data dictionary 114.

Database 126 includes system tables 127 and application data tables 128. System tables 127 may include information associated with database states, database monitoring, database objects and their relationship to one another, and database object statistics including the aforementioned optimizer statistics. Application data tables 128 store data for use by application layer 110. Application data tables 128 include all rows of all base data tables and all index entries created for the base data tables.

Database 126 may store any other suitable information including but not limited to configuration files, database parameters, paths, and user information. In some embodiments, database 126 is an element of an Online Transaction Processing (OLTP) database instance. An OLTP database instance may be suited for processing individual transactions quickly within an environment consisting of a large number of users and a large database.

Database 126 may comprise one or more disparate systems for storing data, therefore DBMS 122 may comprise one or more systems for retrieving stored data. Database 126 may receive data from disparate hardware and software systems, some of which are not interoperational with one another. The systems may comprise a back-end data environment employed in a business or industrial context.

In operation, a developer may control developer workbench 116 to create a definition of a table within application data dictionary 114. When the table is activated, DBMS 122 creates a corresponding data table in application data tables 128 and adds a corresponding definition to database data dictionary 124. The developer may later issue an instruction to alter the definition of the table that was created in application data dictionary 114. In response, DBMS 122 updates the corresponding data table in application data tables 128 and the corresponding definition in database data dictionary 124.

A definition of a table in application data dictionary 124 may specify fields of the table and may indicate which of the specified fields are key fields of the table. Moreover, the definition may indicate that one or more of the fields is associated with a check table.

Figure 2:
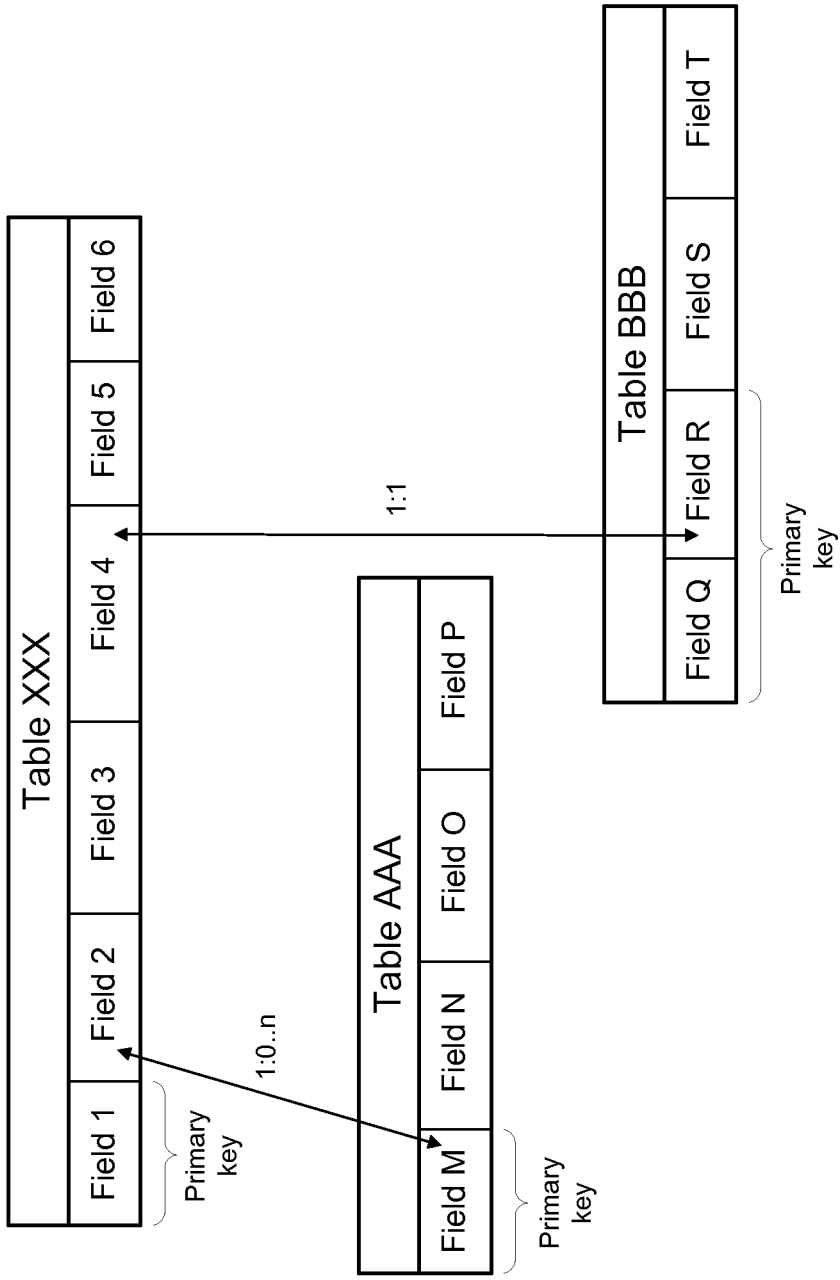
FIG. 2 is a diagram illustrating a relationship between a table field and a check table according to some embodiments.

According to FIG. 2, Field 2 of table XXX is associated with check table AAA and Field 4 of table XXX is associated with check table BBB. As described above, these associations indicate that logical relationships exist between Field 2 and Field M of check table AAA, and between Field 4 and Field R of check table BBB. Further information regarding these logical relationships is provided by cardinality information also shown in FIG. 2.

The "1" on the left side of the cardinality 1:0 . . . n indicates that, for every distinct value of Field 2 in table XXX, exactly one record of check table AAA includes the distinct value in Field M. The "0 . . . n" on the right side of the cardinality indicates that, for each distinct value of Field M, table XXX may include any number (including 0) of records in which Field 2 includes the distinct value.

Similarly, the "1" on the left side of the cardinality 1:1 indicates that, for every distinct value of Field 4 in table XXX, exactly one record of check table BBB includes the distinct value in Field R. The "1" on the right side of the cardinality indicates that, for each distinct value of Field R, table XXX includes exactly one record in which Field 4 includes the distinct value.

An association between a field of a table and a check table therefore indicates that a logical relationship exists between the field and a corresponding field of the check table. A developer may define these associations and associated cardinalities to reflect and support the application logic of application 112. Accordingly, these associations and cardinalities may be reflected in definitions of the table and the check tables stored in application data dictionary 114.

FIG. 3 illustrates definitions 140 through 143 that are associated with tables and stored in application data dictionary 114 according to some embodiments. As mentioned above, table definitions 140 through 143 may be created by a developer of application 112 using developer workbench 116. Moreover, definitions 140 through 143 may be used to create corresponding data tables in database 126 and table definitions in database data dictionary 124.

Definitions 140 through 143 may be used in conjunction with a sales and distribution application according to some embodiments. Definition 140 defines a Sales Document Header Status table that includes several fields.

Definition 140 associates each field with a flag indicating whether or not the field is a key field, and with an indication of whether or not the field is associated with a check table. According to the illustrated example, "N/A" indicates that the field is not associated with a check table and any other indicator comprises an identifier of a check table that is associated with the field.

Definition 140 also indicates a cardinality associated with the field. As described above, the cardinality describes a relationship between a possible number of records of the defined table and a number of records of a check table for a given value of the associated field. Fields that are not associated with a check table are therefore also not associated with a cardinality.

Definitions 141 through 143 include information similar to that described with respect to definition 140. Definition 141 indicates that the table defined by definition 140 is a check table associated with field DocNumber of definition 141.

Also, fields Client of definitions 141 through 143 are associated with a same check table (T000) as field Client of definition 140. Definition 143 indicates that the table defined by definition 140 is a check table associated with field Doc- Number of definition 143, and the table defined by definition 142 is a check table associated with field ItemNumber of definition 143.

Definitions 140 through 143 are illustrated in row-column format but embodiments are not limited thereto. Any or all of definitions 140 through 143 may include a different number of rows and/or columns than illustrated. Data objects stored in application data dictionary 114 may include definitions 140 through 143 as well as many other definitions and objects.

The check table and cardinality information stored in application data dictionary 114 reflect relationships between tables that are defined by an application developer. Actual tables corresponding to definitions 140 through 143 are created in application data tables 128 of database 126. According to some embodiments, activating the tables defined by definitions 140 through 143 causes application layer 110 to send a "create table" or "alter table" SQL command to database layer 120. Database layer 120 then creates (or alters) corresponding definitions 240 through 243 of FIG. 4 in database data dictionary 124.

Definitions 240 through 243 include the same information as respective ones of definitions 140 through 143. In conventional R/3 or OLTP systems, definitions 240 through 243 would not indicate the field/check table associations shown in FIG. 4 because such indications would negatively affect performance of system 100. In particular, DBMS 122 conventionally performs a check on any operation that would modify (e.g. insert, update, or delete) data of a field associated with a check table (i.e. a "foreign key field"). The check determines whether the check table includes a record in which key field data is identical to the to-be-modified data of the foreign key field. Conventional systems therefore also do not provide the illustrated cardinality information of FIG. 4.

Also in contrast to conventional systems, definitions 240 through 243 include, for each field that is associated with a check table, an IntegrityCk flag indicating whether a check should be performed in response to proposed modifications to data associated with the field. DBMS 122 may use such a flag to determine that the above-described check should not be performed in response to any proposed modifications to the associated field. Inclusion of the check table, cardinality, and the flag in table definitions of database data dictionary 124 may provide efficient determination of optimizer statistics without substantial impact to system performance.

Figure 5:
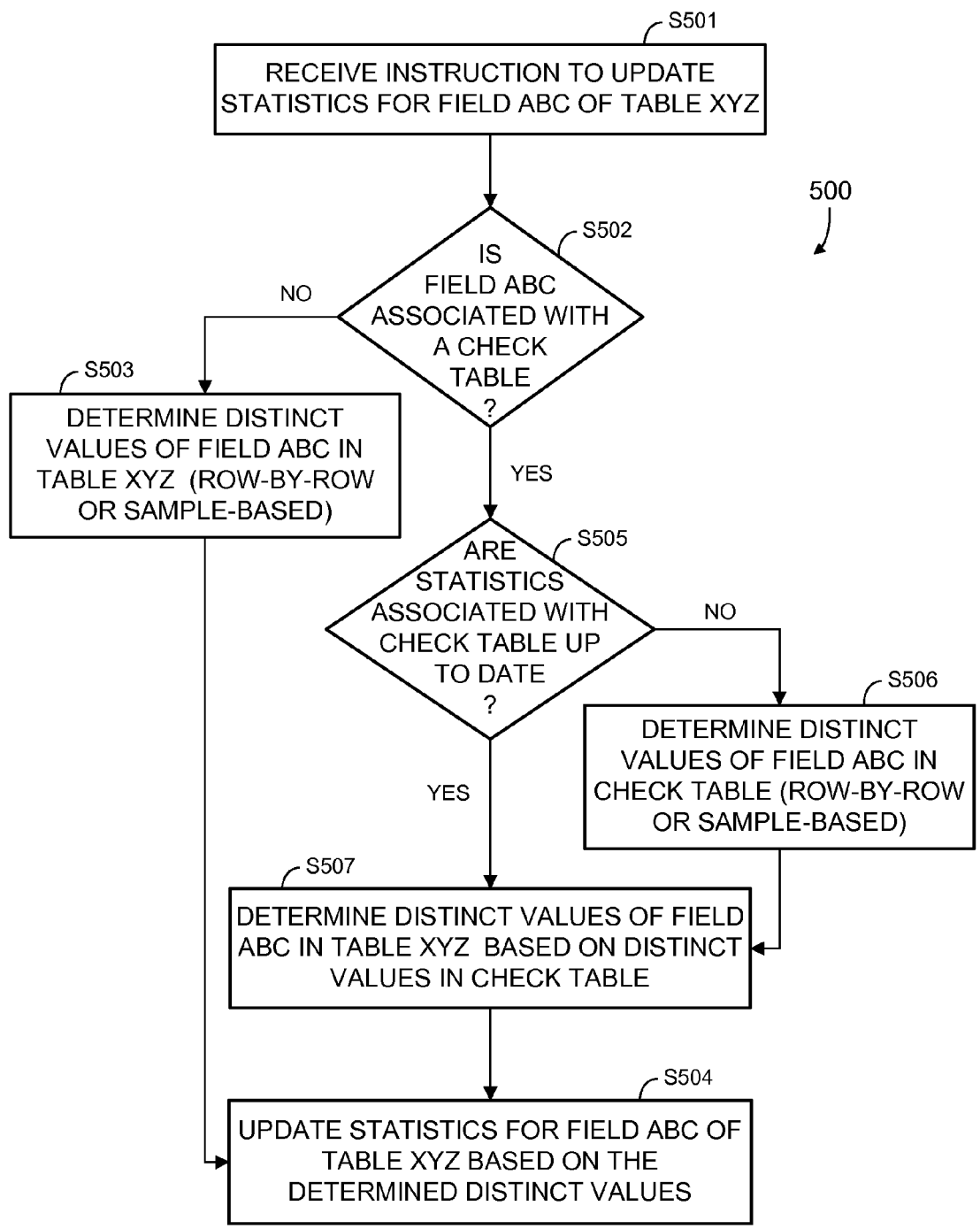
FIG. 5 is a flow diagram of program code according to some embodiments.

FIG. 5 is a flow diagram of process 500 according to some embodiments. Some embodiments of process 500 may be implemented in a system such as system 100 to determine optimizer statistics. Process 500 and all other processes mentioned herein may be embodied in processor-executable program code read from one or more of a computer-readable medium, such as a floppy disk, a CD-ROM, a DVD-ROM, a Zip™ disk, a magnetic tape, and a signal encoding the process, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

In some embodiments, database layer 120 executes program code of DBMS 122 to perform process 500. The following description of process 500 will therefore include examples of each step of process 500 as performed by database layer 120.

Initially, at S501, an instruction to update statistics for a particular field of particular table is received. The instruction may comprise an UPDATE STATISTICS statement that specifies the field and the table, the table only, or all tables of a database. Steps S502 through S507, however, provide updating of statistics associated with a single field (i.e. ABC) of a single table (i.e. XYZ). According to some embodiments, the instruction to update statistics is issued by application layer 110, a database administrator in communication with database layer 120, and/or internally by maintenance tasks of DBMS 122.

At S502, it is determined whether field ABC is associated with a check table. DBMS 122 accesses a definition of table XYZ stored in database data dictionary 124 according to some embodiments of S502. For example, DBMS 122 may access definition 240 in a case that table XYZ is the Sales Document Header Status (SDHS) table. Assuming that field ABC is the field DeliveryStatus of table SDHS, definition 240 indicates that the field is not associated with a check table. Accordingly, flow proceeds to S503.

Distinct values of field ABC in table XYZ are determined at S503. The distinct values may be determined at S503 using conventional techniques. For example, each row of table XYZ may be read to determine a number of distinct values that are associated with field ABC. In a case that table XYZ is large, a sampling of rows may be read to determine a sampled number of distinct values and the total number of distinct values may be extrapolated based on the sampled number.

FIG. 6 is a tabular representation of a portion of physical table SDHS 600 stored in application data tables 128 according to some embodiments. Continuing with the assumption that field ABC is the DeliveryStatus field, three distinct values associated with the field may be determined from table 600 at S503. As shown, the three distinct values are "Delivered", "Not Shipped", and "In Transit".

Statistics associated with the field are then updated at S504. DBMS 122 may update the statistics by storing the determined number into an appropriate field and table of system tables 127. As described above, optimizer 123 may use the updated statistics to select a search strategy in response to a received database query.

Returning to S502, it may be determined that field ABC is associated with a check table. In one example, field ABC is field Client of table SDHS. Accordingly, based on definition 240, DBMS 122 may determine at S502 that field Client of table SDHS is associated with a check table.

Flow therefore proceeds to S505, where it is determined whether statistics associated with the check table are up to date. In the case of field Client of table SDHS, DBMS 122 may check whether statistics associated with table T000 are up to date at S505. According to some embodiments, S505 may comprise determining whether a number of change operations to the table since a last statistics determination exceeds a threshold number. Flow continues to S506 if it is determined that the statistics associated with the check table are not up to date.

At S506, a number of distinct values of field ABC in the check table is determined. Again, each row of the check table may be read to determine a number of distinct values that are associated with field ABC, or a sampling of rows may be read to determine a sampled number of distinct values and the total number of distinct values may be extrapolated based on the sampled number. FIG. 7 is a tabular representation of a portion of physical table T000 700 stored in application data tables 128 according to some embodiments. According to the present example, S506 may comprise determining that three distinct values (i.e., "C123", "C126" and "C128") are associated with the field Client in physical table T000 700.

Flow proceeds to S507 from S506 and directly from S505 if the determination at S505 is affirmative. At S507, a number of distinct values of field ABC in table XYZ is determined based on the number of distinct values in the check table. According to some embodiments, the number of distinct values of field ABC in table XYZ, by definition, cannot exceed the number of distinct values of field ABC in the associated check table. S507 therefore comprises reading rows of table XYZ until the number of distinct values in the associated check table is reached or until all rows of table XYZ have been read.

Referring back to the examples of tables 600 and 700, the three distinct values determined for field Client in table T000 700 is a maximum number of distinct values of field Client in table SDHS 600. Accordingly, the number of distinct values of field Client in table SDHS 600 is determined at S507 based on the maximum number of three. Statistics associated with field Client for table SDHS 600 are then updated at S504 as described above.

Figure 8:
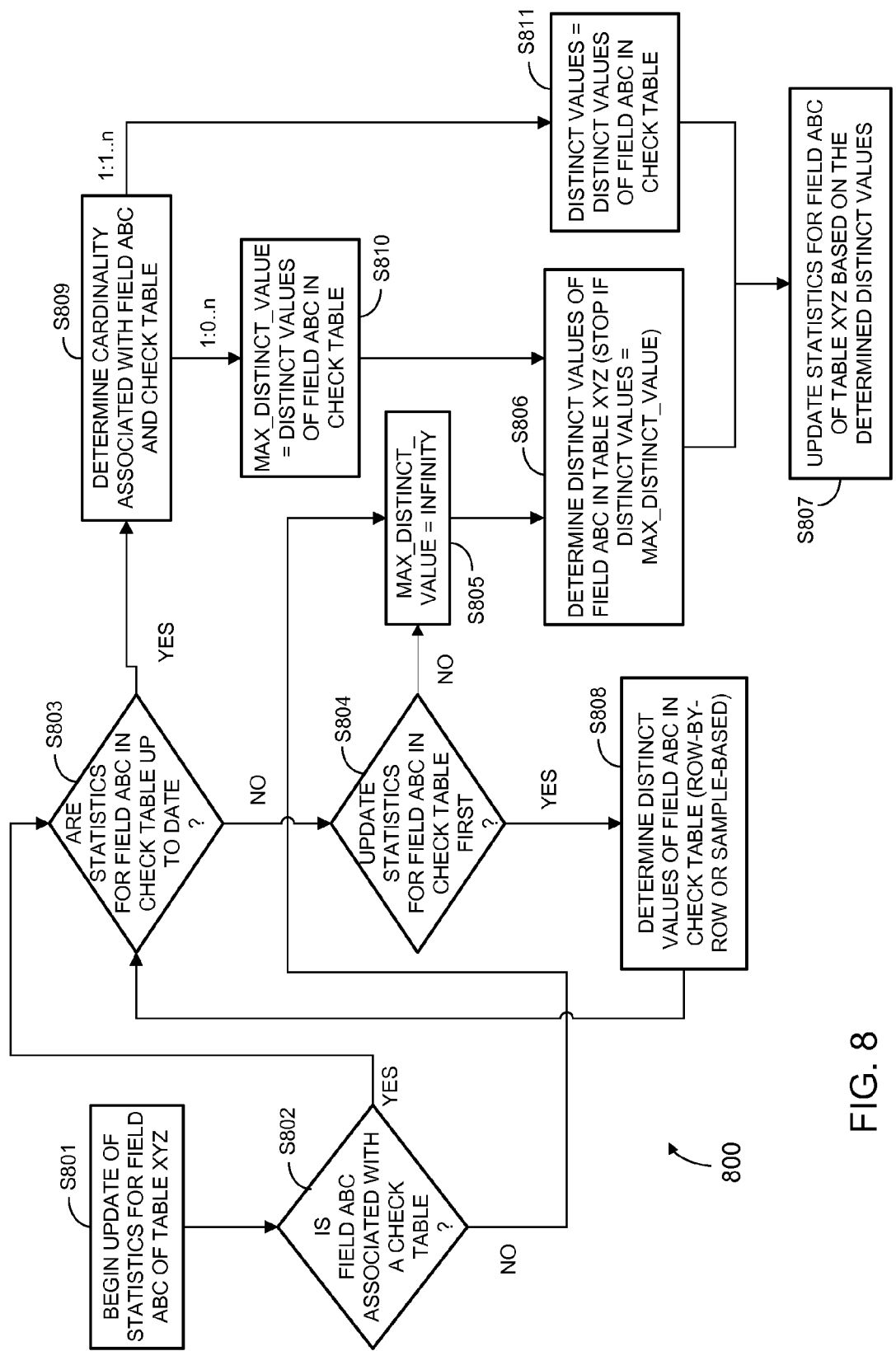
FIG. 8 is a flow diagram of program code of a database management system according to some embodiments.

FIG. 8 is a diagram of process 800 according to some embodiments. Process 800 may be executed to determine statistics for a table based on an associated check table and on associated cardinality information.

An instruction to update statistics for a particular field of a particular table is received at S801. Next, at S802, it is determined whether the field is associated with a check table. If such a check table exists, it is determined whether statistics for the field in the check table are up to date. S801 through S803 may proceed as described above with respect to S501, S502, and S505 of process 500.

At S804, it is determined whether to update statistics for the field in the check table before determining statistics for the field in table XYZ. In this regard, it may be desirable in some instances to determine statistics for the field in table XYZ without regard to statistics of the field in an associated check table. For example, statistics of the check table may be ignored if table XYZ includes a small number of rows and the check table is not associated with any other fields of any other data tables.

If the determination at S804 is negative, a variable associated with a maximum number of distinct values of field ABC in table XYZ is set to infinity at S805. Next, at S806, a number of distinct values of field ABC in table XYZ is determined based on the set variable. Since the maximum number is infinity in the present case, S806 simply comprises reading (or sampling) rows of table XYZ as described above with respect to S503.

Statistics associated with field ABC are updated at S807. Again, DBMS 122 may update the statistics by storing the determined number of distinct values into an appropriate field and table of system tables 127.

Returning to S804, flow proceeds to S808 if it is determined to update statistics of the associated check table prior to updating the statistics for field ABC of table XYZ. Accordingly, a number of distinct values of field ABC in the check table is determined at S808. The determination at S808 may include reading each row or sampling the rows of the check table as described above. Flow returns to S803 from S808, at which point it may be determined that the statistics for field ABC in table XYZ are up to date.

A cardinality is then determined at S809. The cardinality is associated with field ABC of table XYZ and the associated check table. In some examples of S809, DBMS 122 determines a cardinality associated with field Client of table SDHS and check table T000. The cardinality may be determined based on definition 240 of database data dictionary 124. As shown in FIG. 4, the associated cardinality is 1:0 . . . n.

According to some embodiments of S809, the cardinality is not stored in database data dictionary 124 or application data dictionary 114. Rather, the cardinality is determined from referential constraints specified in data dictionary 124. For example, definitions of tables T1 and T2 indicate that each of tables T1 and T2 includes a single key field k, that field k of table T1 is a foreign key for field k of table T2, and that field k of table T2 is a foreign key for field k of table T1. DBMS 122 may therefore determine at S809, based solely on the above-described relationships, that a 1:1 cardinality is associated with field k of table T1 and check table T2. DBMS 122 may also or alternatively determine that a 1:1 cardinality is associated with field k of table T2 and check table T1.

Flow proceeds to S810 in a case that the determined cardinality is 1:0 . . . n, where n=0,1,2 . . . At S810, the variable associated with the maximum number of distinct values of field ABC in table XYZ is set to the number of distinct values of field ABC in the associated check table. In other words, the check table and cardinality associated with field ABC of table XYZ provides the statistics calculation with information as to the upper limit of distinct values within the field. This upper limit may be determined from stored statistics associated with the check table.

Next, at S806, a number of distinct values of field ABC in table XYZ is determined based on the variable. S806 may therefore comprise reading (or sampling) rows of table XYZ until such reading (or sampling) is complete or until the determined number of distinct values of field ABC in table XYZ equals the set variable, whichever occurs first. Then, as described above, statistics associated with field ABC of table XYZ are updated at S807 based on the determined number of distinct values.

Returning to S809, the determined cardinality may be 1:1 . . . n, where n=1,2,3 . . . For example, field ABC of table XYZ may comprise field DocNumber of table Sales Document Header Data (SDHD). Accordingly, based on definition 241 of database data dictionary 124, DBMS 122 determines that the cardinality associated with the field and associated check table SDHS is 1:1. Flow therefore continues to S811 as illustrated in FIG. 8.

At S811, the number of distinct values of field DocNumber in table SDHD is determined to be equal to the number of distinct values of field DocNumber in check table SDHS. Since the statistics for check table SDHS have been previously determined and are up to date due to the determination at S803, the number of distinct values of field DocNumber of table SDHD may be determined at S811 without reading any rows of table SDHD.

To illustrate the logic behind S811, FIG. 9 is a tabular representation of a portion of physical table SDHD 900 stored among application data tables 128 and associated with definition 241 according to some embodiments. Field DocNumber of table SDHD 900 and field DocNumber of SDHS table 600 (the check table) conform to the 1:1 cardinality specified in definition 241. More particularly, the number of distinct values of field DocNumber of table SDHD 900 is equal to the number of distinct values of field DocNumber of table SDHS 600.

The determined statistics associated with the field and table of interest are then updated at S807 as described above.

Embodiments are not limited to determining statistics for a single field in a single table. For example, table T1 includes field a1 and table T2 may include fields a2 and b2, with fields a1 and a2 being related by a 1:1 cardinality. A command is received to update statistics for each of these three fields. Since field b2 is not associated with a check table, all rows of table T2 must be read (or sampled) to determine the distinct values of field b2. The distinct values of field a2 may be determined while the distinct values of field b2 are being determined without requiring additional reads of table T2.

Then, due to the 1:1 cardinality between fields a1 and a2, the distinct values for field a2 may simply be copied to the statistics field associated with field a1.

The embodiments described herein are solely for the purpose of illustration. Those skilled in the art will recognize other embodiments may be practiced with modifications and alterations limited only by the claims.

What is claimed is:

1. A method comprising:
   storing definitions of tables associated with an application in an application data dictionary;
   determining, by a database management system in communication with the database data dictionary, that a field of one of the stored tables is associated with a field of a check table;
   determining, by the database management system, a cardinality indicative of a logical relationship between the field of the table and the field of the check table is $1:0 \ldots n$, $n=0,1,2 \ldots$, or $1:1 \ldots n$, $n=1,2,3 \ldots$;
   reading, by the database management system, in an instance the determined cardinality is $1:0 \ldots n$, $n=0,1,2 \ldots$, rows of the table to identify a number of distinct values of the field in the table until the first of: 1) each row of the table has been read; and 2) the identified number is equal to a number of distinct values of the field in the check table; and
   determining, by the database management system, in an instance the determined cardinality is $1:1 \ldots n$, $n=1,2,3 \ldots$, that the number of distinct values of the field in the table is equal to the number of distinct values of the field in the check table without reading a row of the table.

2. The method according to claim 1, further comprising determining, by the database management system, whether statistics associated with the check table have been updated within a previous predetermined period; and in an instance the statistics associated with the check table have not been updated within the previous predetermined period, determining the number of distinct values of the field in the check table by reading one or more rows of the check table.

3. A method according to claim 1, further comprising:
   storing second definitions of the tables in a database data dictionary; and
   storing tables associated with the second definitions a database.

4. A method according to claim 3, wherein the determining that a field of one of the stored tables is associated with a field of a check table comprises determining that one of the second definitions associated with the stored table indicates that the field of the stored table is associated with a check table.

5. A method according to claim 3, further comprising determining, by the database management system, whether the second definition indicates that the field of the stored table is not to be checked against the check table during an operation to modify data of the field.

6. A non-transitory computer-readable medium storing program instructions thereon, the medium comprising:

program instructions to store definitions of tables associated with an application in an application data dictionary;
   program instructions to determine, by a database management system in communication with the database data dictionary, that a field of one of the stored tables is associated with a field of a check table;
   program instructions to determine, by the database management system, a cardinality indicative of a logical relationship between the field of the table and the field of the check table is $1:0 \ldots n$, $n=0,1,2 \ldots$, or $1:1 \ldots n$, $n=1,2,3 \ldots$;
   program instructions to read, by the database management system, in an instance the determined cardinality is $1:0 \ldots n$, $n=0,1,2 \ldots$, rows of the table to identify a number of distinct values of the field in the table until the first of: 1) each row of the table has been read; and 2) the identified number is equal to a number of distinct values of the field in the check table; and
   program instructions to determine, by the database management system, in an instance the determined cardinality is $1:1 \ldots n$, $n=1,2,3 \ldots$, that the number of distinct values of the field in the table is equal to the number of distinct values of the field in the check table without reading a row of the table.

7. The medium according to claim 6, further comprising program instructions to determine, by the database management system, whether statistics associated with the check table have been updated within a previous predetermined period; and in an instance the statistics associated with the check table have not been updated within the previous predetermined period, program instructions to determine the number of distinct values of the field in the check table by reading one or more rows of the check table.

8. A medium according to claim 6, further comprising:
   program instructions to store second definitions of the tables in a database data dictionary; and
   program instructions to store tables associated with the second definitions a database.

9. A medium according to claim 8, wherein the program instructions to determine that a field of one of the stored tables is associated with a field of a check table comprises program instructions to determine that one of the second definitions associated with the stored table indicates that the field of the stored table is associated with a check table.

10. A method according to claim 8, further comprising program instructions to determine, by the database management system, whether the second definition indicates that the field of the stored table is not to be checked against the check table during an operation to modify data of the field.

* * * * *